(12) United States Patent
Hartleitner et al.

(10) Patent No.: US 6,685,830 B2
(45) Date of Patent: *Feb. 3, 2004

(54) PROCESS AND DEVICE FOR SEPARATION OF ABSORBENT/FLOATING MATERIAL FROM PRODUCT MIXES BY MEANS OF FLOAT/SINK SEPARATION

(75) Inventors: Bernhard Hartleitner, Mering (DE); Siegfried Kreibe, Munich (DE); Thorsten Pitschke, Welden (DE); Josef Wagner, Augsburg (DE); Xaver Deisser, Ehingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/941,035

(22) Filed: Aug. 28, 2001

(65) Prior Publication Data

US 2002/0046968 A1 Apr. 25, 2002

Related U.S. Application Data

(63) Continuation-in-part of application No. 09/353,463, filed on Jul. 13, 1999, now abandoned.

(51) Int. Cl.[7] .............................................. B01D 21/04
(52) U.S. Cl. ........................ 210/262; 210/298; 210/319; 210/383; 210/388; 210/525; 210/526; 210/527
(58) Field of Search ................................. 210/523, 525, 210/526, 527, 528, 530, 262, 295, 298, 319, 383, 388

(56) References Cited

U.S. PATENT DOCUMENTS

| 3,284,282 A | 11/1966 | Immel et al. |
| 4,458,846 A | 7/1984 | Mardigian ................... 241/20 |
| 6,119,866 A | * 9/2000 | Wagner et al. ............. 209/12.1 |

FOREIGN PATENT DOCUMENTS

| DE | 3717839 A1 | 12/1987 | ............. B03B/5/26 |
| DE | 3934874 A1 | 4/1991 | ............. C02F/1/40 |
| DE | 19507703 C1 | 8/1996 | ............. B03B/5/28 |
| FR | 2500 | 8/1982 | ............. C02F/1/40 |
| FR | 2500431 | 8/1982 | ............. C02F/1/40 |
| JP | 52090158 A | 11/1977 | ............. C02C/1/38 |
| JP | 60127111 A | 7/1985 | ........... B29B/17/00 |

* cited by examiner

Primary Examiner—Robert Popovics

(57) ABSTRACT

Device and process for separation of absorbent/floating material from product mixes by means of float/sink separation with a float/sink separator which exhibits a separator tank filled with a liquid separating medium, in which context there are provided devices for generation of a surface flow in the separating medium, which propel the absorbent/floating material as a floating fraction from a pickup point of the product mix to an output point for the floating fraction, along the surface of the separating medium, at such a speed as to inhibit absorption of the separating medium.

9 Claims, 2 Drawing Sheets

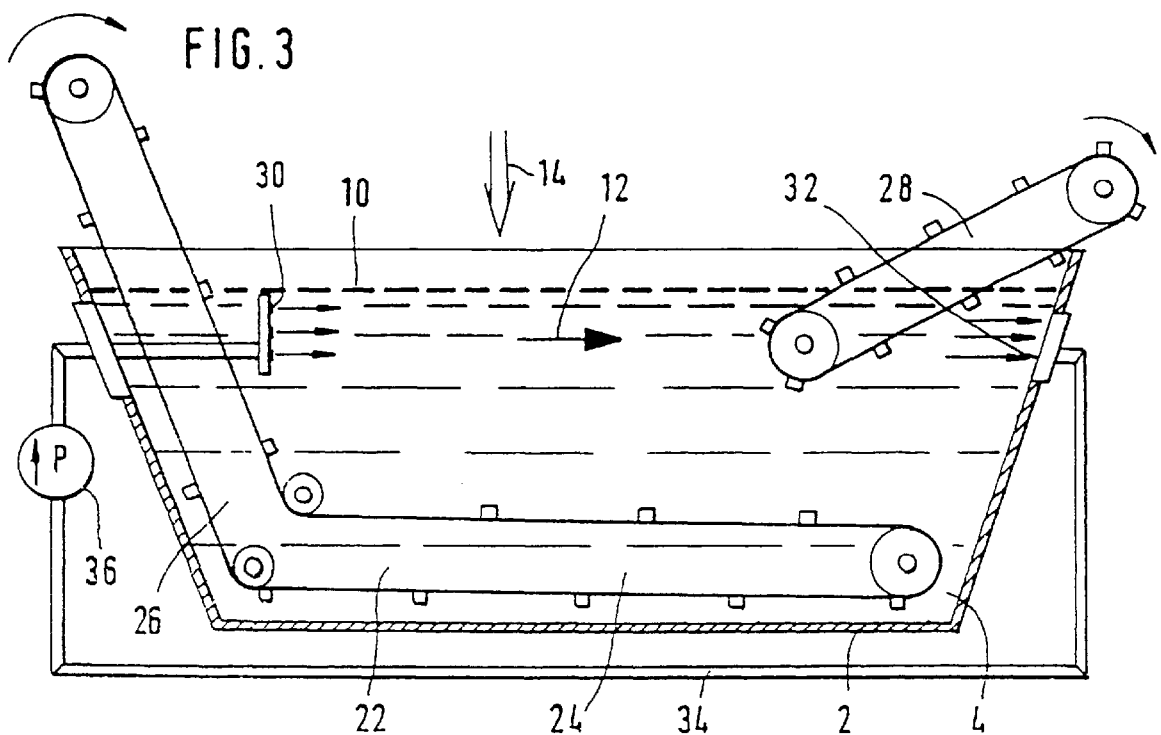
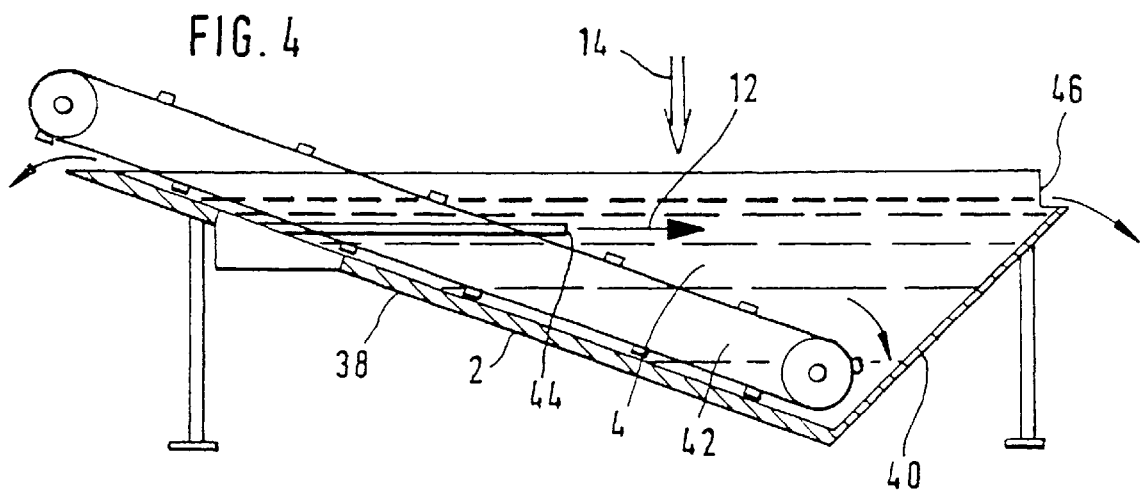

PROCESS AND DEVICE FOR SEPARATION OF ABSORBENT/FLOATING MATERIAL FROM PRODUCT MIXES BY MEANS OF FLOAT/SINK SEPARATION

RELATED APPLICATIONS

This application of Continuation-in-Part of application Ser. No. 09/353,463, PROCESS AND DEVICE FOR SEPARATION OF ABSORBENT/FLOATING MATERIAL FROM PRODUCT MIXES BY MEANS OF FLOAT/SINK SEPARATION, filed Jul. 13, 1999 now abandoned.

FIELD OF THE INVENTION

The invention relates to a process and a device for separation of absorbent/floating material from product mixes by means of float/sink separation.

BACKGROUND OF THE INVENTION

From prior art there are known float/sink separators which are primarily used in the field of separation of plastics. Their mode of operation is the separation of a product mix into a floating fraction and a sinking fraction. Conventional float/sink separators operate on the principle of ensuring an efficient separation process with thorough mixing and wetting of the mix of solids to be separated, and a long dwell time in the separator. For this purpose, the material is usually placed in the separating medium (usually water) with intensive mixing, and repeatedly pushed below the surface of the separating medium by means of appropriate devices. By means of adequately large settlement basins and a long dwell time, it is possible to ensure that the sinking fraction can be adequately completely separated from the floating fraction. The disadvantage of this process is that it is not suitable for separation of absorbent/floating material from a product mix, because material that would otherwise float becomes saturated in the separating medium because of the long dwell time, and then sinks together with the heavier sink fraction.

From generic DE195 07 703 there is known a process and a device for separation of product mixes by means of float/sink separation, in which context, by means of nozzles arranged relatively far below the surface of the separating medium, a flow is generated. This is directed towards the surface of the water in order to drive any absorbent/floating material which has sunk below the surface of the separating medium, such as paper for example, back to the surface of the separating medium, where it is extracted from the device by means of a removal device. The disadvantage of this process is that there is nothing to prevent absorbent material from becoming saturated with the separating medium with the result that it sinks. In particular, the flow directed to the surface of the separating medium prevents the sinking fraction which is moving in the opposite direction from sinking down smoothly. Furthermore, after separation of the floating fraction, a further step is necessary in order to remove the absorbed separating medium from the floating fraction once again.

SUMMARY OF THE INVENTION

On this basis, the objective of this invention is to provide a process and a device for separation of absorbent/floating material from product mixes by means of float/sink separation, in which context it is largely possible to avoid saturation (with separating medium) of the absorbent material to be separated.

This objective is achieved according to this invention by means of a device with the characteristics of claim 1.

The advantage produced by these measures is that the absorbent material cannot become saturated with the separating medium, or only slightly so, during its brief dwell period in the separating medium, and is able to sink. Thus, a simple means is provided for its removal from the surface of the separating medium. Since the absorbent material is rapidly removed from the pickup point, it is possible to prevent a situation, furthermore, in which the upstream product mix presses it below the surface of the separating medium or in which the sinking fraction is prevented from sinking because of the absorbent material remaining at the pickup point.

The process developed for separation of absorbent/floating material and the corresponding device are ideally employed for separation of open-pored plastic foam materials. However, it is also possible to separate closed-pored plastic foam materials or other absorbent/floating materials whose density is less than that of the separating medium, from other materials. If in the case of open-pored foam materials a significant proportion of the pores are filled with air, then the foam particles will float on the surface of the separating medium. This is frequently the case after comminution of foam materials.

The subsidiary claims describe advantageous configurations and useful further developments of the main principles. If the absorbent/floating material is already saturated with a liquid, such as ink for example, before float/sink separation, then a particularly advantageous configuration of this type can be achieved by separation of a proportion of the liquid, for example by means of a vibrating filter, as a stage preliminary to float/sink separation. In this way it is also possible to make absorbent material which is extensively saturated with liquid adequately buoyant for subsequent float/sink separation.

BRIEF DESCRIPTION OF THE DRAWINGS

Further advantageous configurations and useful further developments of the main principles are described in the remaining subsidiary claims, and their details can be taken from the following specimen description by consultation of the drawings.

The drawings illustrate:

FIG. 3: a diagrammatic view of a float/sink separator as per the invention in a second specification; and FIG. 4: a diagrammatic view of a float/sink separator as per the invention in a third specification.

DETAILED DESCRIPTION OF THE PREFERRED EMBODIMENT

Figure 1:
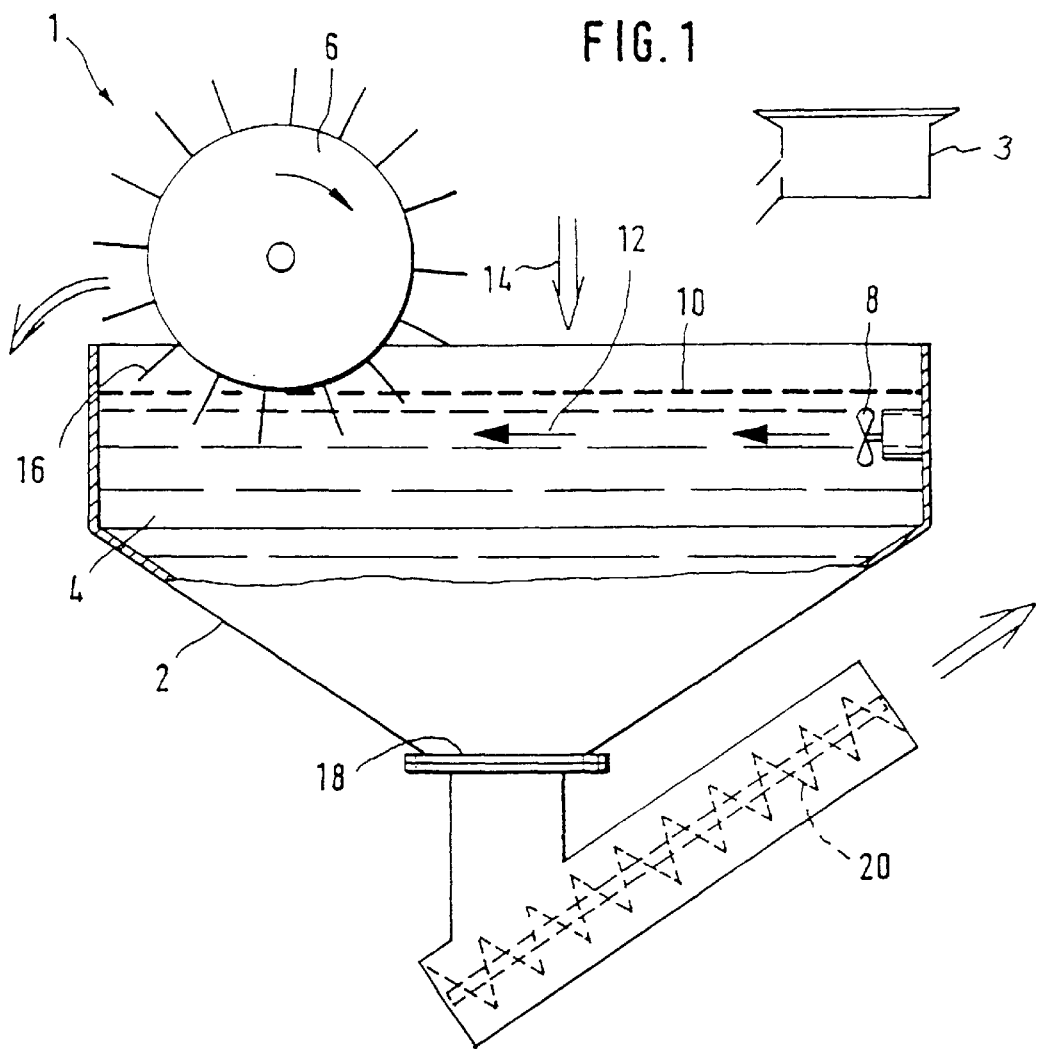
FIG. 1: a diagrammatic view being a side view of the device as per the invention, in an ideal specification.
Figure 2:
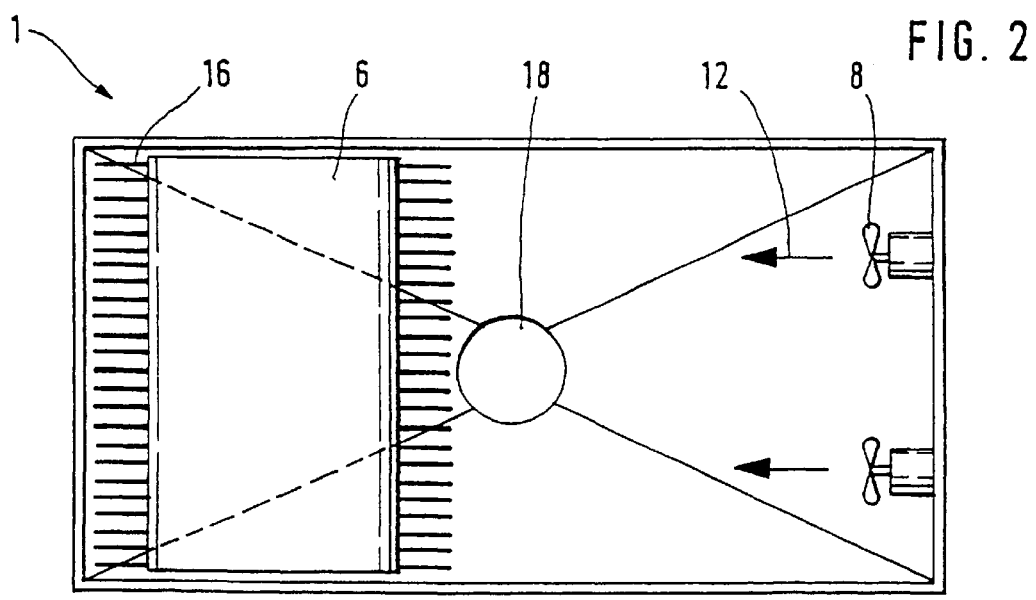
FIG. 2: a diagrammatic view being a plan view of the device as per the invention in the ideal specification.

The device illustrated in FIG. 1, in accordance with an ideal specification, is intended for separation of plastic foam materials from comminuted ink cartridges. At the present time, ink cartridges are used in printers, fax machines etc. as disposable cartridges and arise in large quantities in the form of waste once their capacity of ink has been consumed. An ink cartridge of this type contains an absorbent and readily deformable plastic foam material which is surrounded by an ink cartridge casing. The absorbent foam-type material is used for absorption of the ink and for its stabilization within the ink cartridge so as to prevent sloshing of the ink when the ink cartridge is moved at high speed together with the print head inside the printer. In particular, this plastic foam material itself still contains a certain residual proportion of ink when the ink cartridge is spent. In order to remove at least a proportion of this residual ink from the plastic foams, in the ideal specification the ink cartridges are initially coarsely comminuted in a grinder in order to release the plastic foam materials which are then fed together with the other ink cartridge particles into a vibrating filter 3, in order to enable ink to flow out from them.

The coarse fraction consisting of comminuted ink cartridge particles is then fed to the float/sink separator 1 illustrated in FIG. 1, which exhibits a hopper type separating tank 2 in which there is ideally stored water as separating medium 4. Float/sink separator 1 exhibits, at the edge of separator tank 2 a rake wheel 6 which is partially immersed in the water and which is rotary-driven for removal of the floating fraction. Motor driven propellers 8, which are arranged at the diametrically opposite edge of separator tank 2 and close below the surface of water 10, produce a surface flow 12 in the direction of rake wheel 6, in which context surface flow 12 is generated only in the upper levels of separating medium 4 and is ideally parallel to the surface of water 10.

Next, if the coarsely comminuted ink cartridges which contain, amongst other things, floating plastic foam materials and heavier plastic particles, are passed to a pickup point 14 between propellers 8 and rake wheel 6 to the surface of water 10, then the floating plastic foam materials are picked up by surface flow 12 which is directed towards rake wheel 6 and are promptly driven towards rake wheel 6. The speed of surface flow 12 in this context is set such that depending on the plastic foam materials, their degree of wetting with ink and the density of separating medium 4, it is precisely possible to prevent the plastic foam materials from being able to become saturated with water on their way from pickup point 14 to rake wheel 6.

The rapid outflow of plastic foam materials towards rake wheel 6 is also a factor preventing the surface of water 10 from becoming covered with floating plastic foam materials and which prevents the sinking of heavier ink cartridge particles arriving from upstream. On the other hand, surface flow 12 must not be too powerful, in the interests of preventing the heavier sinking fraction from also being driven out.

Depending on the type of plastic foam material, it is also possible to use a separating medium 4 other than water and in particular it is possible to vary the density and flow rate of separating medium 4 in order to prevent saturation and sinking of the plastic foam material. The plastic foam materials to be driven onto rotating rake wheel 6 are fed from its rake 16 out of separator tank 2 for further processing The heavier, non-floating ink cartridge particles sink as a sinking fraction to the bottom of hopper-form separator tank 2 configured by a hopper aperture 18. Since surface flow 12 can only be generated in the upper levels of separating medium 4, the sinking fraction is largely able to sink perpendicularly and without disturbance. Hopper aperture 18 of separator tank 2 communicates with a feed of a screw conveyor 20 in which the sinking fraction sinks and can be transported away. During sinking, the ink cartridge particles give up a further proportion of the ink attaching to them into the water, so that in addition to separation there simultaneously occurs cleaning of the ink cartridge particles.

Due to the draining of ink from the plastic foam materials in the vibrating filter, before float/sink separation, it is possible to ensure furthermore that plastic foam materials which are largely saturated with ink are made buoyant for float/sink separation, because otherwise they would sink due to the higher density of ink in relation to water. It is thus advantageous to envisage this step if there is still a relatively large quantity of ink in the plastic foam materials.

In FIG. 3 there is illustrated a further specification of the device as per the invention, in which context identical or similar components to those of the ideal specification are given reference numbers. The removal of the floating/sinking fraction is performed by means of an essentially known scraper floor 22, 28. Scraper floor 22 for removal of the sinking fraction exhibits a horizontal scraper floor component 24 which largely covers the entire floor area of separator tank 2 and a scraper floor component 26 which is connected to it and which is inclined, and which extends along the peripheral inner surface of the peripheral panel up to the upper edge of separator tank 2. Scraper floor 28 for removal of the floating fraction is arranged level on the diametrically opposite edge of separator tank 2 and is inclined such that a proportion of scraper floor 28 is immersed in the water for pickup of the floating fraction, and such that the other component extends over the edge of separator tank 2 in order to feed the floating fraction out of separator tank 2.

Surface flow 12 in this specification is generated by water nozzles 130 which are arranged close below the surface of water 10 diametrically opposite scraper floor 28 for pickup of the floating fraction. On the side of separator tank 2 opposite to the water nozzles 30, on the peripheral panel, there is located an extraction device 32 which is connected in the direction of flow by means of a line 34 to a pump 36 and thereafter to water jets 30, in order to set up a circulatory flow. In this context, surface flow 12 within separator tank 2 configures a free section of circulatory flow from water nozzles 30 to extraction device 32. The pressure and quantity of the water flowing out from water nozzles 30 can be set by means of pump 36, in which context the water continuously flows out of water nozzles 30 or can be pulsed out.

In accordance with a further specification which is illustrated in FIG. 4, separator tank 2 has an asymmetrical channel section with a longer side panel 38 and a shorter side panel 40. The sinking fraction is removed by means of scraper floor 42 which is positioned along the longer side panel 38. For production of surface flow 12, in turn, nozzles 44 are envisaged which, in separating medium 4, generate a surface flow 12 towards an overflow 46 at which the floating fraction is removed over the edge of separator tank 2.

The invention is not restricted to the three specifications described. For removal of the floating fraction, a screw conveyor could also be inserted arranged transverse to surface flow 12. For removal of the sinking fraction, for example, it is also possible to use a rake which is moved in a translational motion along the floor of separator tank 2.

It should be understood that the foregoing description is only illustrative of the invention. Various alternatives and modifications can be devised by those skilled in the art without departing from the invention. Accordingly, the present invention is intended to embrace all such alternatives, modifications and variance which fall within the scope of the appended claims.

We claim:

1. A float/sink separation device for separation of absorbent/floating material from product mixes, the absorbent/floating material at least partially saturated with residual fluid, said separation device comprising:

a vibrating filter for extraction of the residual fluid from absorbent/floating material and producing a filtered product mix;

a separating tank positioned to receive the filtered product mix from the vibrating filter, the separating tank filled with a liquid separating medium and having a flow generating device creating a surface flow in the separating medium and propelling the absorbent/floating material as a floating fraction from a reception point of the product mix to an output point for the floating fraction, at such a speed that absorption of the separating medium is substantially avoided; and a mechanism for removal of the separated floating fraction from the separating tank.

2. The float/sink separation device of claim 1, wherein the flow generating device comprises motor driven propellers positioned below the surface of the separating medium.

3. The float/sink separation device of claim 1, wherein the flow generating device comprises nozzles which are positioned below the surface of the separating medium and from which separating medium is ejected under pressure.

4. The float/sink separation device of claim 1, wherein the mechanism for removal of the floating fraction from the separation tank comprises a rake wheel in to propel the floating fraction out of the separator tank.

5. The float/sink separation device of claim 1, wherein the mechanism for removal of the floating fraction from the separation tank comprises a circulating scraper which is arranged at the edge of the separator tank and which is partially immersed in the separating medium.

6. The float/sink separation device of claim 1, further comprising a mechanism for removal of a sinking fraction from the separating tank.

7. The float/sink separation device of claim 6, wherein the mechanism for removal of the sinking fraction comprises a circulating scraper floor which is immersed in the separating medium and which extends from the bottom of the separator tank to above its upper edge.

8. A float/sink separation device for separation of absorbent/floating material from product mixes, the absorbent/floating material at least partially saturated with residual fluid, said separation device comprising:

filter means for producing a filtered product mix;

a separating tank positioned to receive the filtered product mix from the filter means, the separating tank filled with a liquid separating medium and having flow generation means creating a surface flow in the separating medium and propelling the absorbent/floating material as a floating fraction from a reception point of the product mix to an output point for the floating fraction, at such a speed that absorption of the separating medium is substantially avoided; and means for removal of the separated floating fraction from the separating tank.

9. The float/sink separation device of claim 8, further comprising means for removal of a sinking fraction from the separating tank.

* * * * *